(No Model.)
T. J. GANTT.
MEASURING VESSEL.
No. 244,883.  Patented July 26, 1881.
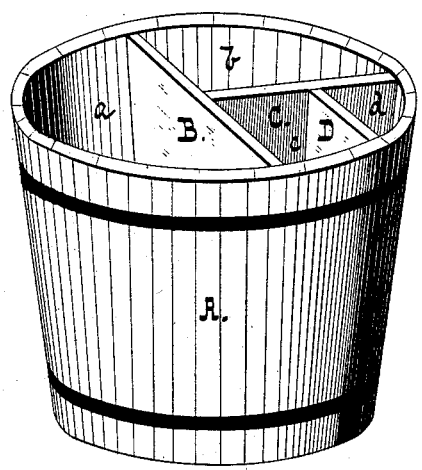
WITNESSES.
INVENTOR
BY
ATTORNEY.

UNITED STATES PATENT OFFICE.

THOMAS J. GANTT, OF BALTIMORE, MARYLAND.

MEASURING-VESSEL.

SPECIFICATION forming part of Letters Patent No. 244,883, dated July 26, 1881.

Application filed June 1, 1881. (No model.)

*To all whom it may concern:*

Be it known that I, THOMAS J. GANTT, of Baltimore city, State of Maryland, have invented certain new and useful Improvements in Measures; and I hereby declare the same to be fully, clearly, and exactly described as follows, reference being had to the accompanying drawing, in which a measure embodying my invention is illustrated in perspective view.

The object of my said invention is to furnish a vessel of a conventional measure having internal partitions extending from its bottom upward, subdividing the interior into compartments which shall bear to each other and to the entire contents of the vessel the relations of the conventional subdivisions of the entire measure. The want of such a vessel has been long felt by marketmen, hucksters, and others who are called upon to rapidly measure out to customers a desired quantity of a material. To meet this need in a degree the usual half-bushel or peck measure has its bottom placed sufficiently far within the body of the measure to make, when the vessel is inverted, a second measure; but by this means the same vessel is but two measures, and more are required if the occasional necessity of refilling one of them to make up the desired quantity of material is to be avoided.

I have devised a measure adapted for the minutest subdivision, whereby a single vessel meets all possible requirements.

In the drawing, A represents a measure of the usual form, subdivided by partitions B C D into compartments $a$ $b$ $c$ $d$. The compartments are made to extend flush with the upper edge of the measure, whereby they may be "struck" as usual. In the case illustrated the vessel A may contain a bushel, the compartment $a$ a half-bushel, $b$ a peck, $c$ a half-peck, and $d$ a quart, or they may bear to each other the conventional relations of the liquid measure—gallons, quarts, pints, and gills. The subdivisions may be applied in different relations to the opposite end of the measure, and, if constructed of sheet metal or other thin material, the partitions may be applied to measures already in use, it being only necessary to plane off or cut away the bottom of the measure to compensate for the cubical contents of the partitions themselves. As the latter are straight and meet each other and the walls at right angles, facility is afforded for securing them in place, and, as they terminate flush with the rim of the vessel, the compartments may be struck, if desired. This latter feature is of paramount importance in the case of a huckster's measure, as the purchaser expects the measure to be heaped above the rim.

The measure costs but little more than the ordinary one, and is a very handy and useful article.

What I claim is—

1. As a new article of manufacture, a measure subdivided by vertical partitions extending from its bottom to the rim into compartments whose cubical contents bear to each other the ratio of the conventional measure, substantially as set forth.

2. A measure having vertical partitions meeting each other and the walls and bottom of the measure at right angles, and subdividing the vessel into compartments whose relative size conforms to the conventional standard, as set forth.

THOMAS J. GANTT.

Witnesses:
R. D. WILLIAMS,
JNO. T. MADDOX.